(12) United States Patent
Schlarb et al.

(10) Patent No.: US 8,489,640 B2
(45) Date of Patent: Jul. 16, 2013

(54) FIELD EXTENSIBILITY USING GENERIC BOXED COMPONENTS

(75) Inventors: Uwe Schlarb, Ostringen (DE); Stefan A. Baeuerle, Rauenberg (DE); Bernhard Thimmel, Edingen-Neckarhausen (DE); Matthias Lehr, Weinheim a.d.B. (DE); Karsten Fanghänel, Schwetzingen (DE); Johannes Haselberger, Walldorf (DE); Anne Jacobi, Wiesloch (DE); Bertram Vielsack, Malsch (DE)

(73) Assignee: SAP AG, Walldorf (DE)

( * ) Notice: Subject to any disclaimer, the term of this patent is extended or adjusted under 35 U.S.C. 154(b) by 160 days.

(21) Appl. No.: 12/838,594

(22) Filed: Jul. 19, 2010

(65) Prior Publication Data

US 2012/0016910 A1 Jan. 19, 2012

(51) Int. Cl.
*G06F 7/00* (2006.01)
*G06F 17/30* (2006.01)

(52) U.S. Cl.
USPC .......................................... 707/792; 707/803

(58) Field of Classification Search
CPC .......... G06F 17/30867; G06F 17/30067; G06F 17/30595; G06F 17/30607; G06F 17/30286; G06Q 10/10; G06Q 10/06
USPC .................. 707/791, 802, 822, 792, 793, 803
See application file for complete search history.

(56) References Cited

U.S. PATENT DOCUMENTS

| | | | |
|---|---|---|---|
| 7,996,850 B2* | 8/2011 | Massmann et al. | 719/320 |
| 2006/0101091 A1* | 5/2006 | Carbajales et al. | 707/202 |
| 2008/0162536 A1* | 7/2008 | Becker et al. | 707/102 |
| 2010/0161648 A1* | 6/2010 | Eberlein et al. | 707/769 |

FOREIGN PATENT DOCUMENTS

| | | |
|---|---|---|
| EP | 1 494 131 A1 | 6/2003 |
| WO | 2005/098593 A2 | 10/2005 |

OTHER PUBLICATIONS

Willis, G. "Architecture SIG—Feb. 2007", Internet Article, [Online], Feb. 2007, XP002552304, [retrieved on Oct. 26, 2009], Retrieved from the Internet: URL: http://www.acs.org.au/nsw/sigs/architecture//Architecture-200702.pdf>, (pp. 1-44, total 44 pages).
Taylor, M. et al., "Data Integration and Composite Business Services, Part 3: Build a multi-tenant data tier with access control and security", Internet Article, [Online], Dec. 13, 2007, XP002552301, [retrieved on Oct. 26, 2009], Retrieved from the Internet: URL:http://www.ibm.com/developerworks/data/library/techarticle/dm-0712taylor/>, (pp. 1-16, total 16 pages).
Joseph W. Yoder et al., "Architecture and Design of Adaptive Object-Models", ACM SIGPLAN Notices, XP-002249967, vol. 36, No. 12, Dec. 2001, pp. 50-60 (total 11 pgs.).
"European Search Report", dated Oct. 13, 2009, for European Application No. 09011280.6, 2pgs.
"European Search Report of the European Patent Office", mailed Oct. 26, 2009, for EP 09011216.0-1243, 1pg.
Stefan A. Bauerle et al., U.S. Appl. No. 12/198,315, entitled "Dynamic Extension Fields for Business Objects", filed Aug. 26, 2008.
Stefan A. Bauerle et al., U.S. Appl. No. 12/198,351, entitled "Dynamic Node Extension Fields for Business Objects", filed Aug. 26, 2008.
Stefan A. Bauerle et al., U.S. Appl. No. 12/198,392, entitled "Functional Extensions for Business Objects", filed Aug. 26, 2008.
Gerd M. Ritter et al., U.S. Appl. No. 12/339,328, entitled "UI-Driven Binding of Extension Fields to Business Objects", filed Dec. 19, 2008.
Peter Eberlein et al., U.S. Appl. No. 12/339,392, entitled "Flexible Multi-Tenant Support of Metadata Extension", filed Dec. 19, 2008.

* cited by examiner

*Primary Examiner* — Kimberly Wilson
*Assistant Examiner* — Hexing Liu
(74) *Attorney, Agent, or Firm* — Buckley, Maschoff & Talwalkar LLC

(57) ABSTRACT

A system may include reception of a definition of an extension field to be added to a business object node, generation of metadata for a data type enhancement object associated with the extension field, and generation of an ABAP dictionary proxy object based on the data type enhancement object, wherein the ABAP dictionary proxy object describes the extension field in a sub-structure of a first field of the ABAP dictionary proxy object.

18 Claims, 9 Drawing Sheets

FIELD EXTENSIBILITY USING GENERIC BOXED COMPONENTS

FIELD

Some embodiments relate to business objects within a business process platform. More specifically, some embodiments relate to supporting extension fields of more than one client within a business process platform.

BACKGROUND

An application platform may implement business objects to support different business solutions. A business object, for example, is a software model representing real-world items used during the transaction of business. A business object may comprise a SalesOrder object model or an Organization object model. Instances of these object models, in turn, represent specific data (e.g., SalesOrder SO435539, ACME corporation).

A business object may specify business logic and/or data having any suitable structure. The structure may be determined based on the requirements of a business scenario in which the instance is to be deployed. A business application for a particular business scenario may require many business object instances, where the structure of each has been determined based on the requirements of the particular business scenario.

A customer deploying a business solution may desire changes to a business object included in the business solution. For example, a customer may require a field (e.g., SerialNumber) which does not exist within the Product business object of a business solution. In addition, another customer may require an additional node or query within the Product business object of the same business solution.

Some conventional application platforms support the addition of extension fields to nodes of existing business objects. Consequently, these application platforms are able to store data associated with instances of these extension fields (e.g., SerialNumber 27/44,234) in a primary persistency (e.g., a relational database, flat files). This data can then be consumed by user interfaces, queries and other entities supported by the application platforms.

A business process platform may operate on proxy objects corresponding to its supported business objects. Systems are desired to facilitate appropriate generation of a proxy object based on an extended business object in a multi-client system supporting client-specific extension fields.

BRIEF DESCRIPTION OF THE DRAWINGS

FIG. 4 is a view of a user interface according to some embodiments.

FIG. 5 is a view of a user interface according to some embodiments.

FIG. 6 is a view of a user interface according to some embodiments.

DETAILED DESCRIPTION

Figure 1:
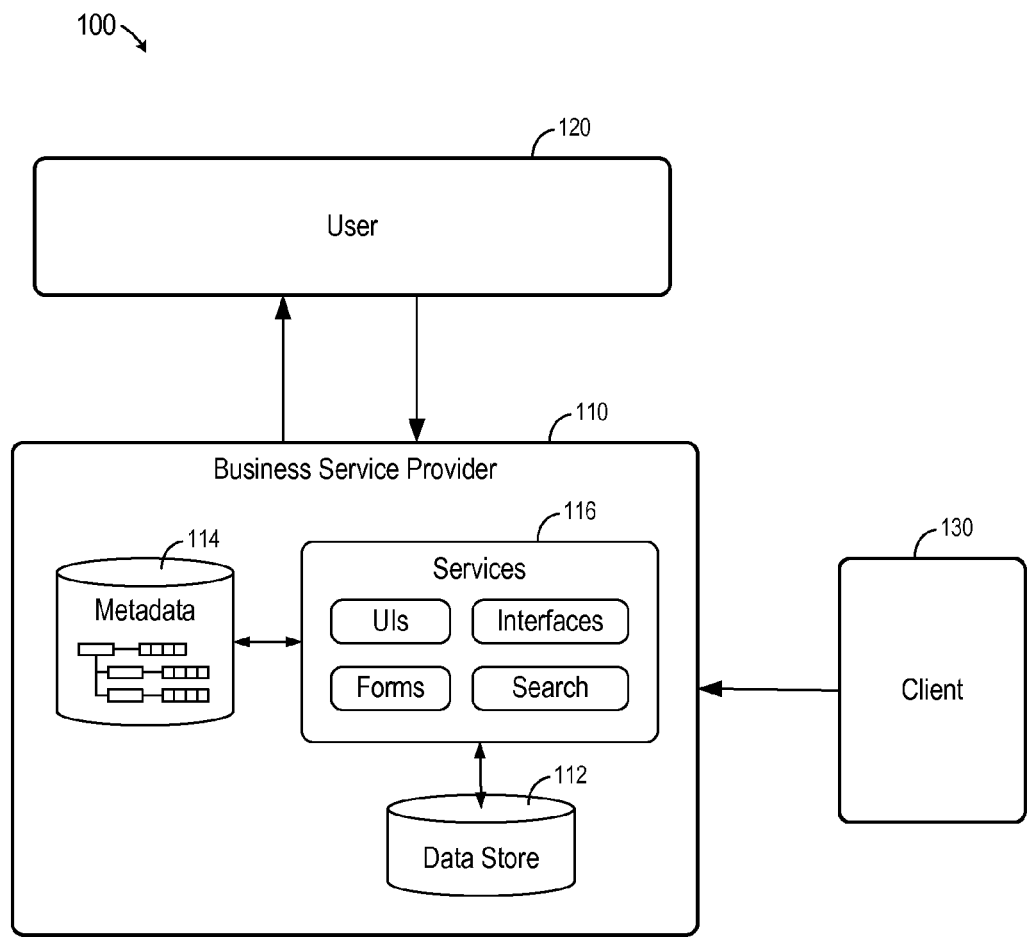
FIG. 1 is a block diagram of a system according to some embodiments.

FIG. 1 is a block diagram of system 100 according to some embodiments.

System 100 includes business service provider 110 for providing business services to user 120 on behalf of client 130. For example, client 130 may represent an enterprise employing business service provider 110 to facilitate business processes, and user 120 may represent any entity (e.g., an employee of client 130) requiring interaction with business service provider 110 to further the business processes of client 130.

Business service provider 110 might receive requests from user 120 and provide responses to user 120 via a service-oriented architecture such as those provided by SAP Business ByDesign® or Salesforce®. The use of remotely-hosted business service provider 110 may help client 130 avoid the costs and problems associated with maintaining a local, "in house" Enterprise Resource Planning (ERP) system.

Business service provider 110 might store client information into and retrieve client information from physical tables of data store 112. Data store 112 may comprise a relational database such as SAP MaxDB, Oracle, Microsoft SQL Server, IBM DB2, Teradata and the like. Alternatively, data store 112 could be a multi-dimensional database, an eXtendable Markup Language (XML) document, or any other structured data storage system. The physical tables may be distributed among several relational databases, dimensional databases, and/or other data sources. To provide economies of scale, data store 112 may include data of more than one client. Business service provider 110 includes mechanisms to ensure that a client/user accesses only the data that the client/user is authorized to access.

The structures of and relationships between the physical database tables may be complex, and business objects may be used to shield developers and end-users from these complexities. A business object may comprise, for example, a software model including nodes to encapsulate related data and methods. As described above, a business object may be associated with a business entity, such as a client, partner, sales order, product, store, time, etc., represented in the data of a data source. Each instance of a business object may represent a particular instance of the entity represented by the business object. An instance of a SALES_ORDER business object may, for example, provide a mapping to the underlying tables storing data associated with a particular sales order.

Metadata 114 includes metadata defining metadata models and object models. The object models (or objects) are instances of the metadata models. The metadata models may include generic models of a BI view, a floorplan, a business object, a user interface text, a process component, a data type and a message type, but embodiments are not limited thereto. The metadata models and object models may be embodied in any type of data structure, including but not limited to eXtensible Markup Language files. As in the conventional storage of object instance data, the metadata defining the specific metadata models and object models may be stored in database tables and/or any other suitable format.

Each metadata model may comprise an instance of a same meta-metadata model. The meta-metadata model may consist of nodes, composite associations, associations, elements structure and attribute properties. Development of specific business objects, specific floorplans, etc. may therefore proceed using the same development technologies. Moreover, access and lifecycle issues of the various object models may be managed using similar (or identical) mechanisms.

Metadata 114 provides information regarding the structure and attributes of the data of underlying business object instances (i.e., the data stored in data store 112). Metadata 114 may include design-time and/or runtime proxy objects generated based on other metadata (e.g., an eXtensible Markup Language (XML) representation of business object 115) stored therein. For example, metadata 114 may include Advanced Business Application Programming (ABAP) proxy objects which are consumed by ABAP code of applications/services residing in business service provider 110.

Services 116 may use metadata 114 to access data of data store 112. In accordance with this paradigm, an extension field that is modeled within the metadata of a business object allows services 116 to store and retrieve data associated with the extension field.

Services 116 include any business services that are or become known. Services 116 may provide user 120 with user interfaces, print forms, search capabilities, message interfaces (e.g., A2X, B2B), etc. based on data stored in data store 112 and defined by metadata 114. As described above with respect to a change to a user interface, extension fields may be added to these entities in order to retrieve data and provide services including extension field data. For purposes of the present description, entities to which extension fields may be added in order to consume corresponding business object data will be referred to as consuming business entities.

User 120 may execute a Web browser to access services 116 via HyperText Transport Protocol (HTTP) communication. For example, a user may manipulate a user interface of user 120 to input an instruction (e.g., "show me a sales report"). User 120, in response, may transmit a corresponding HTTP service request to business service provider 110. Services 116 may conduct any processing required by the request (e.g., generating views and user interfaces) and, after completing the processing, provide a response to user 120.

User 120 might comprise a Personal Computer (PC) or mobile device executing a Web client. Examples of a Web client include, but are not limited to, a Web browser, an execution engine (e.g., JAVA, Flash, Silverlight) to execute associated code in a Web browser, and/or a proprietary standalone application.

Client 130 may customize consuming business entities which are provided by business service provider 110. In particular, client 130 may add an extension field to a user interface (and to its corresponding business object) as described in aforementioned U.S. patent application Ser. No. 12/339,328. Embodiments may facilitate addition of such an extension field to other consuming business entities.

Figure 2:
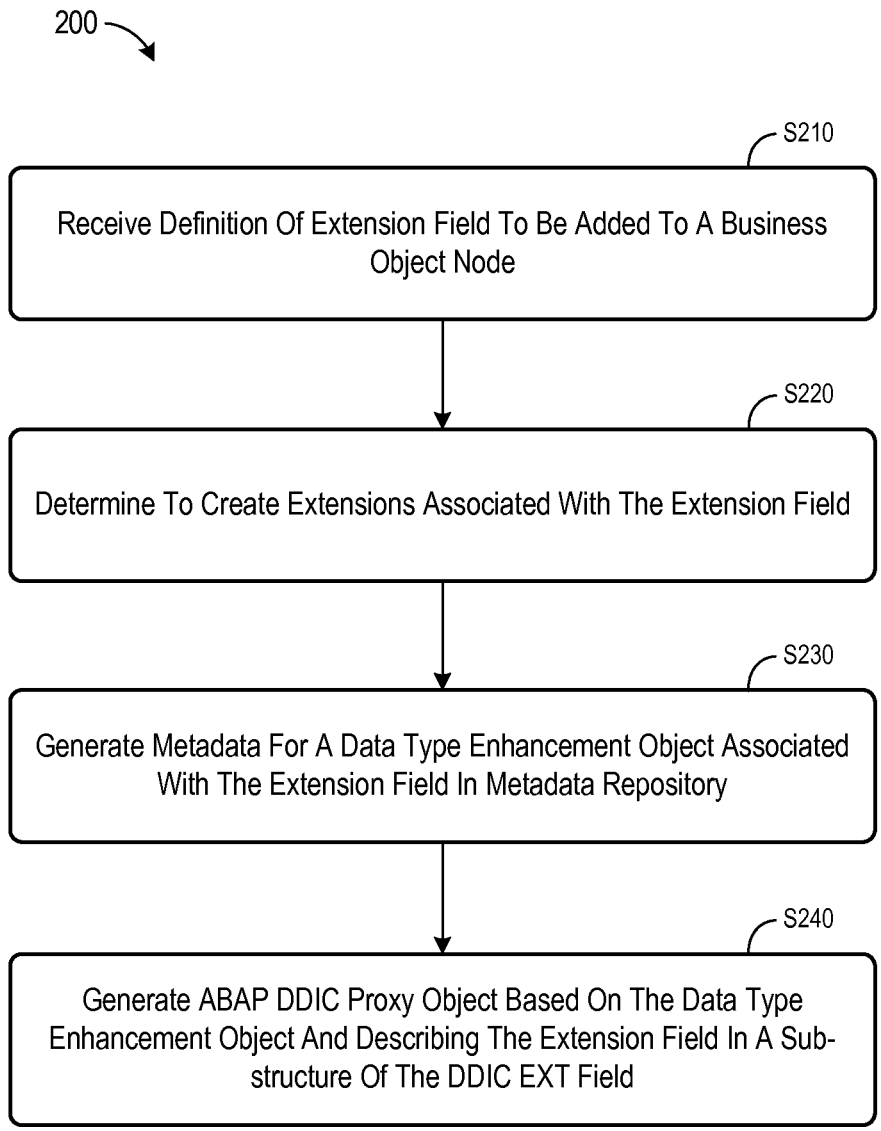
FIG. 2 is a flow diagram of a process according to some embodiments.

FIG. 2 is a flow diagram of process 200 according to some embodiments. Business service provider 110 may execute portions of process 200 as will be described below, but embodiments are not limited thereto. In this regard, all processes described herein may be executed by any combination of hardware and/or software. The processes may be embodied in program code stored on a tangible medium and executable by a computer to provide the functions described herein.

Embodiments will be described below in which an extension field is added to a business object node via a reference field. Embodiments, however, are not limited to any particular mechanism for adding client-specific extension fields.

A developer of a business service provider may define reference fields for various consuming business entities. A reference field definition (i.e., a reference field bundle) may point to a specific portion of a consuming business entity (e.g., a location on a user interface) and to a field in the data model of the user interface (i.e., as representing the path down to a corresponding persistent business object node).

According to some embodiments, a reference field bundle includes metadata defining all reference fields within a single consuming business entity. Embodiments are not limited to defining reference fields using metadata of reference field bundles.

Figure 3:
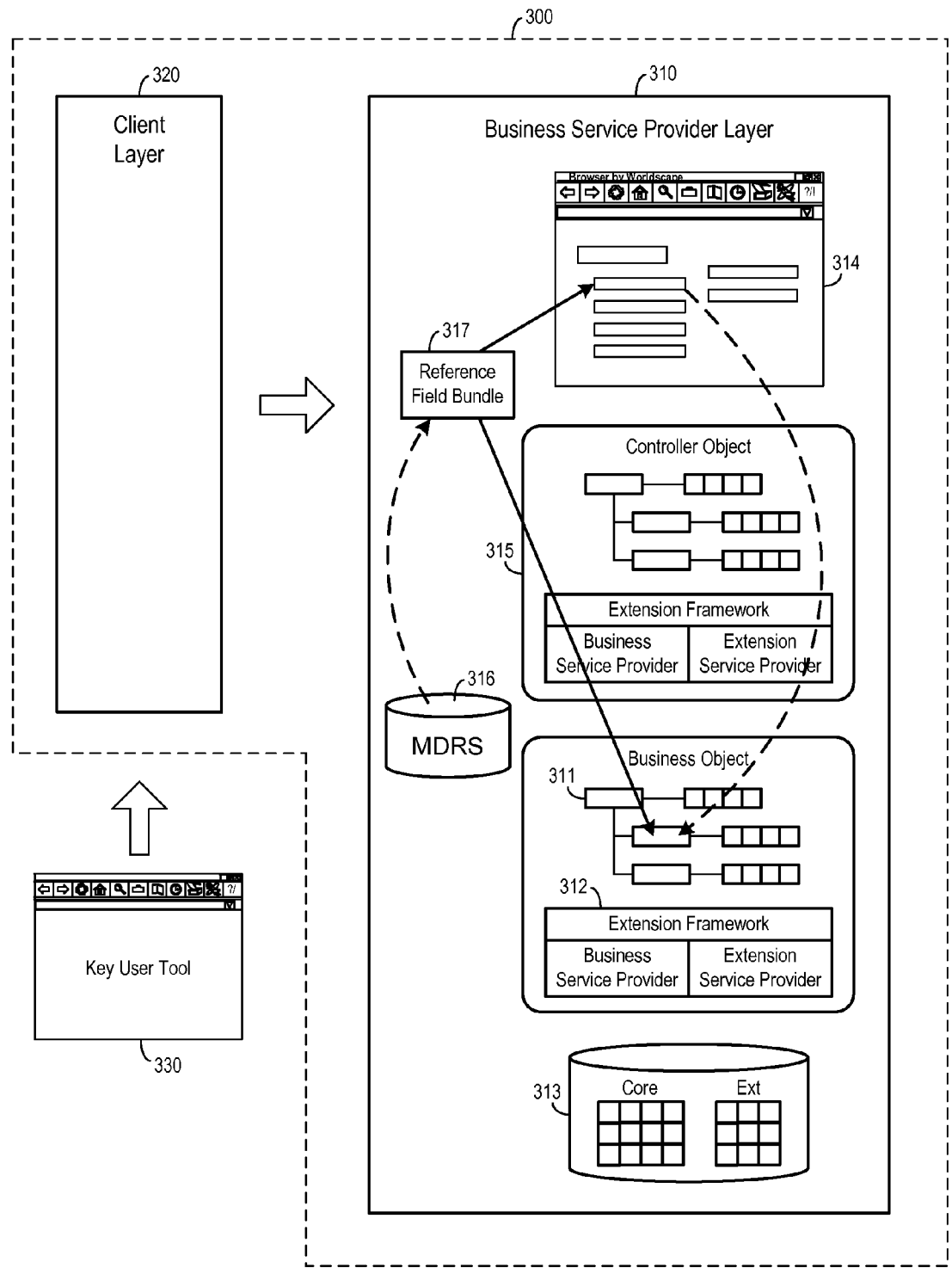
FIG. 3 is a block diagram of a system according to some embodiments.

FIG. 3 is a block diagram to according to some embodiments. Backend 300 includes business service provider layer 310 and client layer 320.

Business services provider layer 310 includes business object 311 and extension framework 312, which resides between business object 311 and core/extension data stored separately in database 313. User interface 314 may access business object 311 via an access mechanism 315 associated with interface 314. Access mechanism 315 could be implemented by, for example, (i) a Frontend Service Adaptation (FSA), (ii) a Controller Object (CO) implementation, (iii) a Backend Service Adaptation (BSA), (iv) an ABAP platform, (v) a Data Dictionary (DDIC), (vi) manual coding, (vii) a Fast Search Infrastructure (FSI), (viii) a Transformed Object (TO), or (ix) a Transformation Node (TN).

Metadata repository (MDRS) 316 stores reference field bundle 317. Reference field bundle 317 is associated with user interface 314 and maps a displayed element of user interface 314 (i.e., specified by the "path" described above) directly to a node of business object 311. Accordingly, reference field bundle 317 allows easy identification of the node without requiring knowledge of the access mechanism which lies between user interface 314 and business object 311. Reference field bundles may provide similar mappings between business object nodes and message types, etc.

MDRS 316 also includes an ABAP data dictionary (DDIC) structure prepared by a developer of backend 300. The structure contains a field at which a dynamic box may be added based on the ABAP "generic boxed components" technology. Specifically, the structure contains a field (e.g., named "EXT") which is typed with a "Customer-Include-Structure" created automatically by a DDIC Function Module DD_TABL_SET_GENERIC_BOX).
For example: DDIC Structure CRM_SO_HDR_ELEM
Field SHIP_TO TYPE CRM_SHIP_TO_ID
Field SHIP_DATE TYPE GDT_DATE
Field EXT TYPE CI_CRM_SO_HDR_ELEM Additionally, the enhancement category of the structure is set to "polymorphic extensible" to allow the addition of the generic box.

A proxy structure is also created in MDRS 316 with the Flag DYNAMIC='X' to allow client-dependent extensions. Accordingly, the metadata model for Data Types will include the attribute DynamicExtensibleIndicator. If this Indicator is set to "true" for a particular data type model, a corresponding ABAP proxy object will be generated including the EXT field.

In this regard, the fields of a business object node are defined by a data type. Accordingly, the addition of an extension field to a node requires addition of corresponding information to the representing data type. To code against the extension field, ABAP requires the addition of this information to a sub-structure of a field of the DDIC proxy object which is associated with the data type.

MDRS 316 may provide several categories of data types (e.g., Core Data Type, Query Data Type, Message Data Type, etc.). For each category, some embodiments specify whether the DynamicExtensibleIndicator attribute is editable and, if so, whether a default value thereof is "true" or "false".

The following specifications are implemented according to some embodiments:

| Data Type Category | DynamicExtensibleIndicator Editable | Default Value |
|---|---|---|
| Core Data Type (Amount, Name, etc.) | No | |
| Basic GDTs (Country Code, BP Id) | No | |
| Message Basic GDTs | No | |
| Aggregated GDTs (Delivery Terms, Validity Period) | No | |
| Message Aggregated GDTs | No | |
| Message-GDTs (e.g., Address) | Yes | false |
| (F)MDTs ((Forms) Message Data Type | Yes | false |
| (F)MIDTS ((Forms)Message Intermediate Data Type) | Yes | true |
| Key Data Types (e.g. structured alternative keys) | No | |
| BOIDTs (BO internal Data Types, e.g. Status Data Types) | No | |
| QIDTs (Query Internal Data Types) | No | |
| NDTs (Node Data Type) | Yes | true |
| ADTs (Action Data Type) | Yes | true |
| QDTs (Query Data Type) | Yes | true |
| FDTs (Filter Data Types) | No | |
| Free Style | Yes | false |
| <space> | Yes | true |
| Note: Majority of Data Types with category = space come from the A1S Layer, e.g. for ECOs | | |

For existing backends, all data types in MDRS 316 which should be dynamically extensible can be migrated to make the EXT Field available. For example, all data types for which the default value of DynamicExtensibleIndicator is "true" are selected. DynamicExtensibleIndicator is set to "true" for these data types, and corresponding proxies are regenerated.

Returning to process 200, a definition of an extension field to be added to a business object node is received at S210. Any system (e.g., an extensibility framework) may be employed to create and transmit the definition that is received at S210. According to the present example, a user operates key user tool 330 prior to S210 to add an extension field to user interface 314 based on reference field bundle 317.

Figure 4:
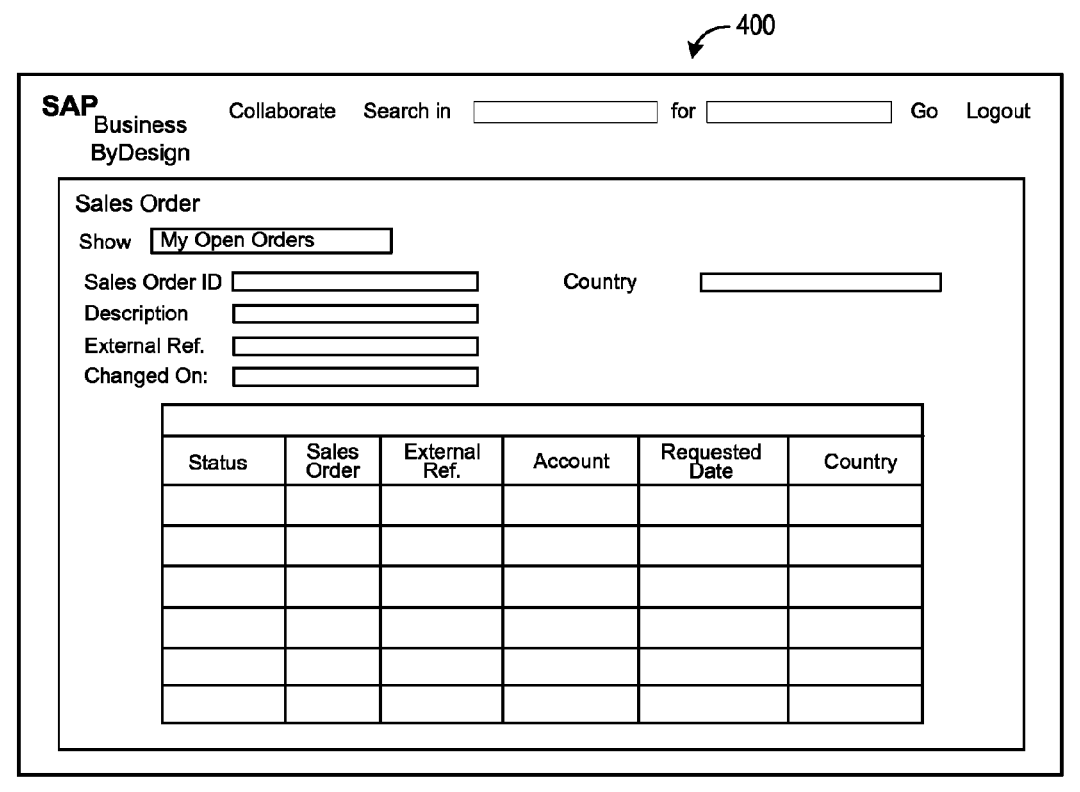

FIG. 4 is an outward view of interface 400 of a key user tool such as key user tool 330. In some embodiments, FIG. 4 reflects an on-demand Web-based solution in which user interface 400 is displayed by a Web browser. According to the present example, interface 400 is user interface SALES_ORDER_UI associated with a SALES_ORDER business object and including a reference field Country defined within reference field bundle 317.

Figure 5:
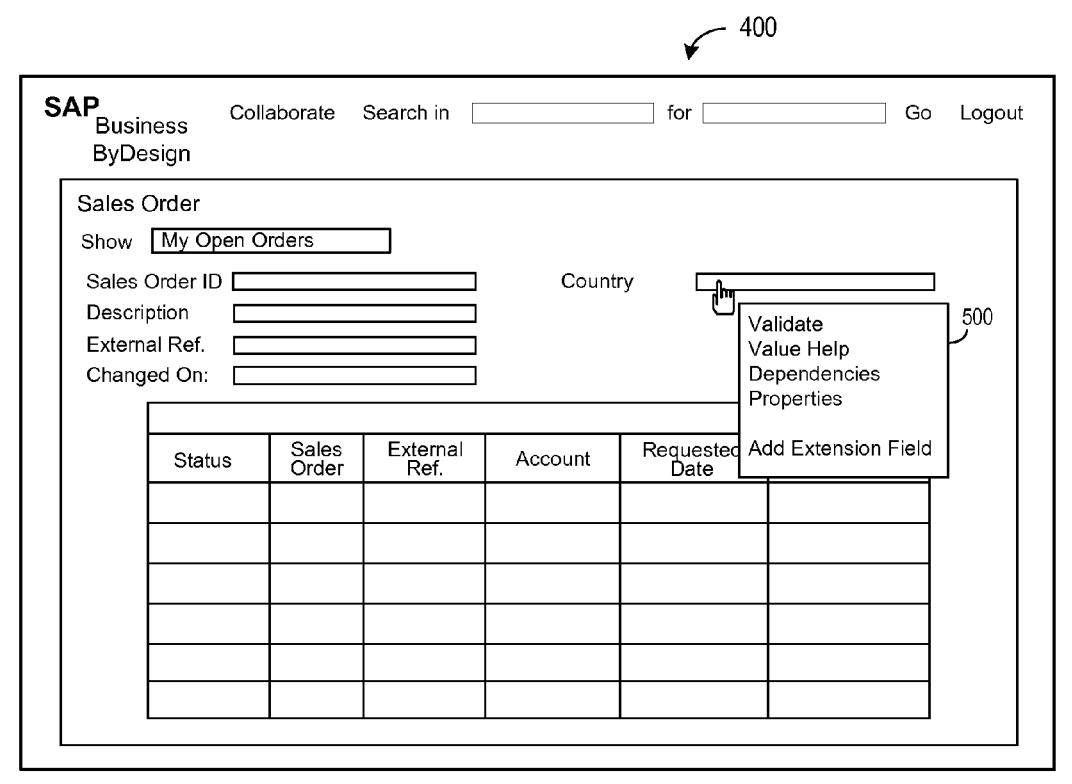
Figure 6:
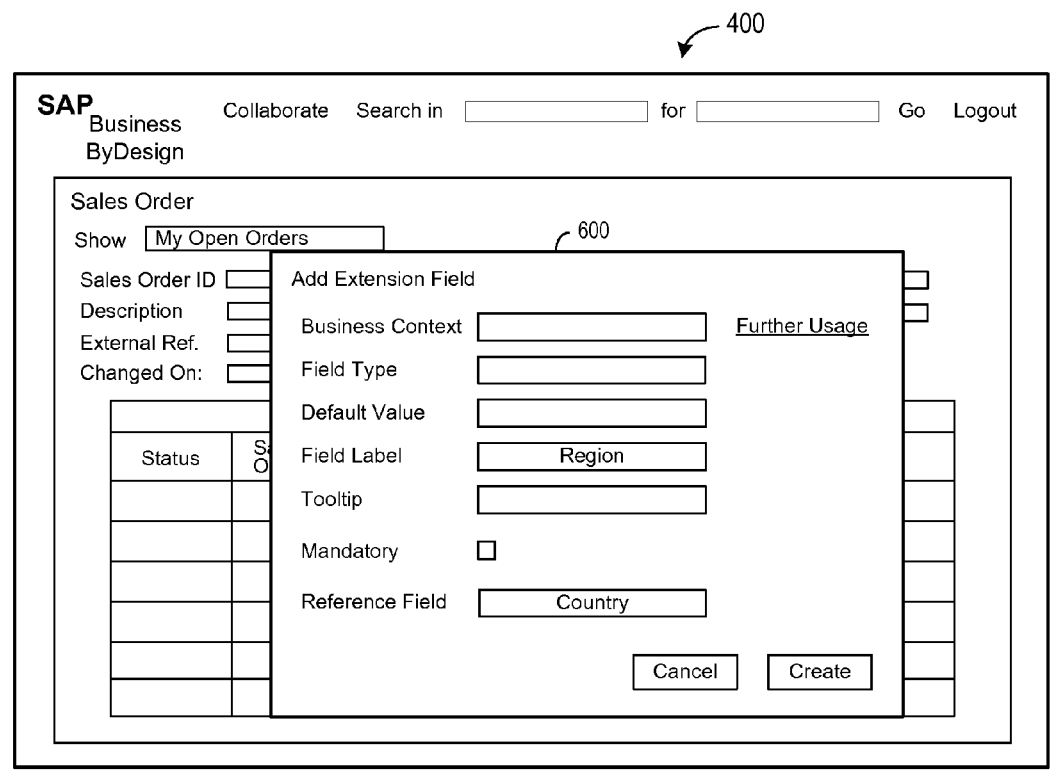

FIG. 5 illustrates user interface 400 and context menu 500. Context menu 500 is presented in response to "right-clicking" on the Country field of user interface 400. Context menu 500 provides several options, one of which is "Add Extension Field". Selection of the "Add Extension Field" option results in presentation of dialog 600 of FIG. 6.

Dialog 600 includes input fields for specifying a Business Context of the extension field, a Field Type (e.g., string, currency, date, etc.), a Default Value, a Field Label, a Tooltip and a Reference Field. The user has input "Region" into dialog 600 as the extension field name. According to the example, the Reference Field input field is pre-populated with "Country" because the Country field was previously selected.

Further attributes of the extension field may also be derived from the reference field. In some embodiments, the properties of the extension field are identical to the properties of the reference field. Alternatively, the properties of the reference field may be derived based on the properties of one or more other fields selected from user interface 400. Any property may be dependent on field values (e.g., "mandatory only in U.S.").

Figure 7:
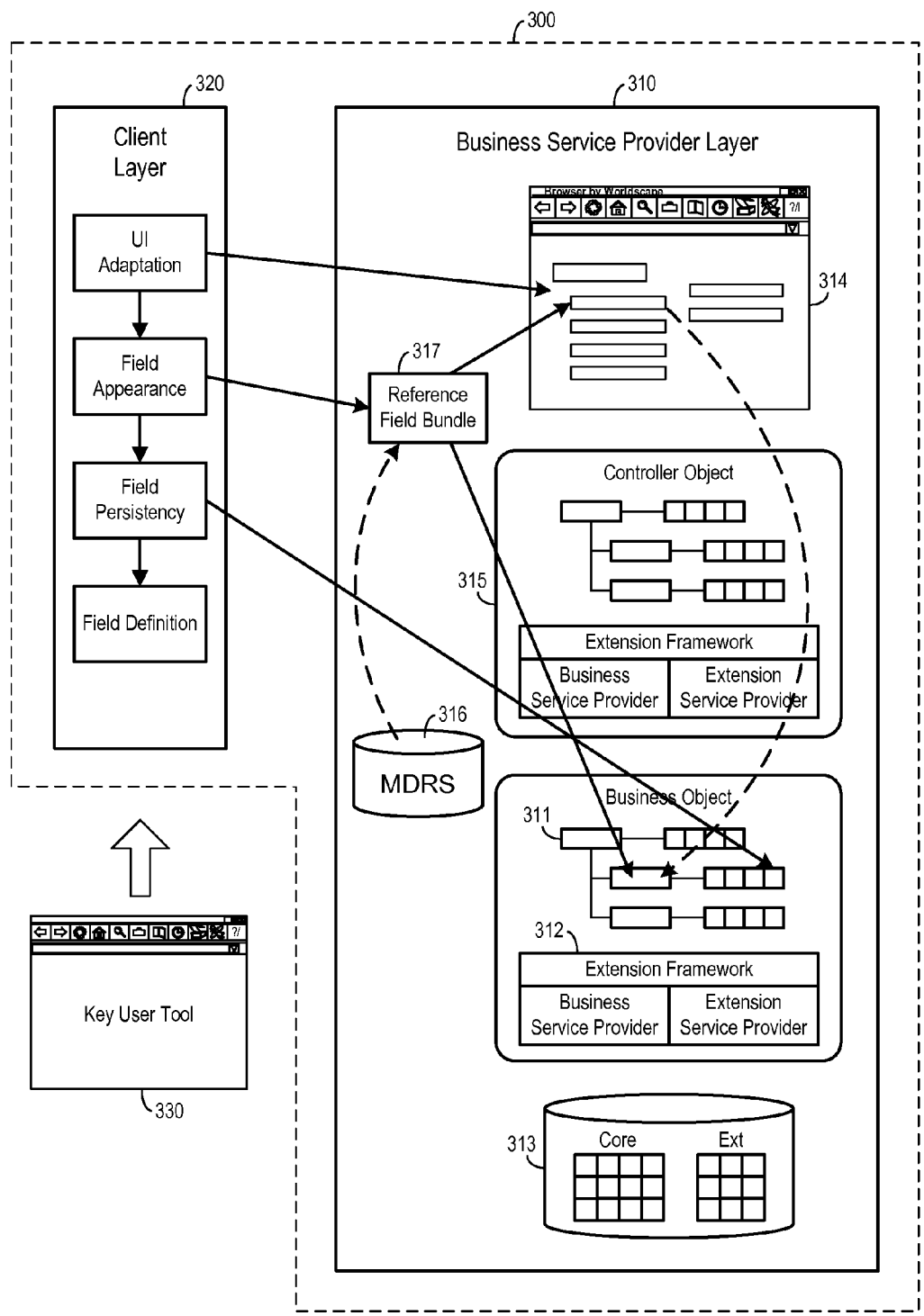
FIG. 7 is a block diagram of a system according to some embodiments.

In response to the definition received at S210, several metadata entities are created in client layer 320. As shown in FIG. 7, the entities may include: (1) a "field definition" object containing type, label, code list, etc.; (2) a "field persistency" object containing the field definition and to which business object node it is logically attached; (3) a "field appearance" object describing that a field described in the "field persistency" object is to be added to a user interface analogous to the reference field; and (4) a "user interface adaptation" object describing the positioning of the new field on the user interface.

These metadata entities are not specifically relevant to runtime. However, before activating these entities to generate corresponding runtime artifacts, it must be determined at S220 to create extensions associated with the extension field. More specifically, and according to some embodiments, the reference field is read and, based on the physical field identified by the reference field, two determinations are performed: 1) where to add a new field (e.g., to which business object node); and 2) which runtime models to extend (e.g., BSA model or FSI model).

The present example is concerned with data type enhancements (i.e., enhancements to node element data types of a core business object and controller business objects, and to data types used in message types). As will be described below, and according to some embodiments, data type enhancements are created in MDRS 316 and a corresponding proxy object that is generated based thereon will be a dynamic boxed component.

Extensions are assumed to be client-dependent. The extensions are separated via Namespaces to avoid collisions, and each extension may include administration information describing in which client it is active.

Figure 8:
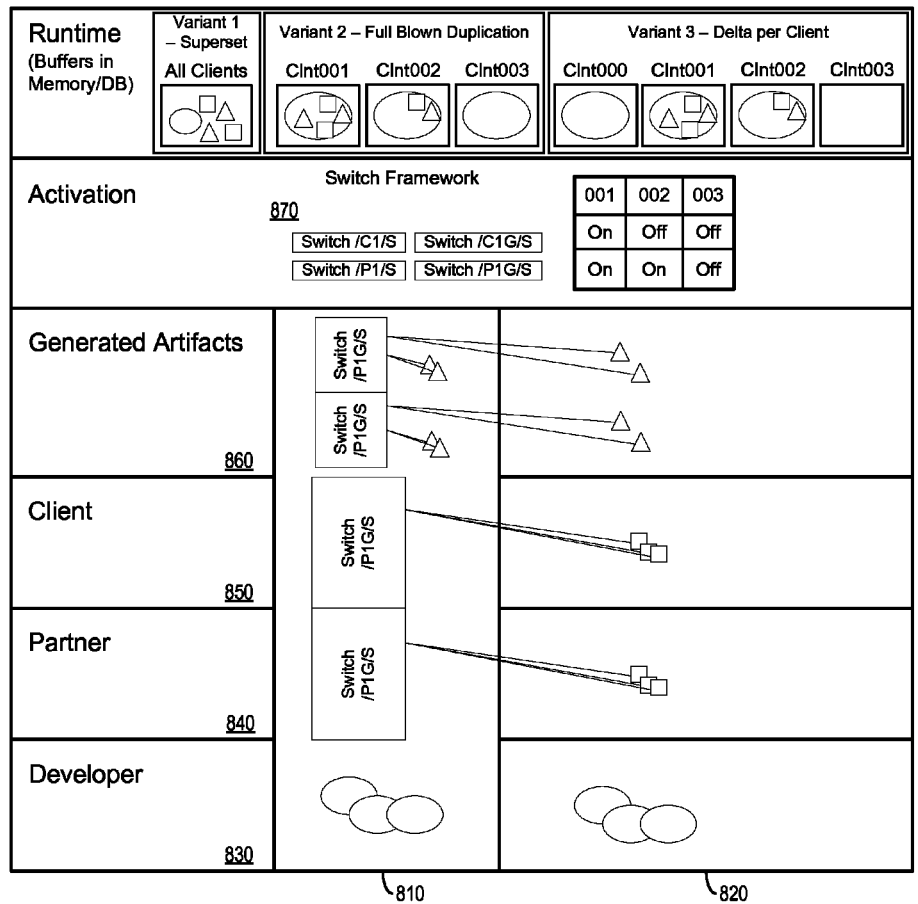
FIG. 8 is a block diagram of illustrating a switch framework according to some embodiments.

The determination at S220 may be implemented based on a switch framework as illustrated in FIG. 8. As shown, MDRS 316 includes "classical" repositories 810 representing the ABAP world. Repositories 810 contain ABAP code, DDIC objects, and ABAP transport objects such as BSA models, FSI models, etc. MDRS/Xrep repository 820 contains business objects, data types, process agents, UI models, etc. as described above.

MDRS objects which can be created either in a Partner Scenario or in a Customer Scenario exhibit a two-fold persistence. That is, for the partner scenario, one set of tables is client-independent and is handled as normal ABAP transport objects. A second set of tables is provided for the customer layer, in which the client (and the user) is part of the key. Thus, the associated metadata can be stored in a client-dependent manner.

A developer of business service provider layer 810 may deliver a variety of objects in developer layer 830 of these repositories (e.g., business objects, UI models, etc.). Developer layer 830 may also include extension layers (e.g., for Globalization).

Partner layer 860 is based on developer layer 830. The objects of different partners are located in a separate Software Component Version and in different creator-specific namespaces to ensure that the delivered entities are technically collision free. The entities may use classical ABAP namespaces in which the first characters of any object name (which is upper case CHAR30) may contain the ABAP namespace (e.g., /P1/). The maximum length of such a namespace is 10 characters in some embodiments.

The ABAP namespace may be defined centrally (e.g., at the beginning of a development process) to avoid naming collisions. In addition many of the MDRS objects provide Enterprise Service Repository (ESR) names and namespace. An ESR namespace can be longer than an ABAP namespace (e.g., up to 120 characters). It may be assumed that this namespace is also centrally-provided when the partner approaches the developer.

The metadata of client layer 850 are stored in client-dependent tables. A separate set of namespaces is provided for each client (i.e., ABAP+ESR Namespace). For example, /C1/ may be used for a specific client. In some embodiments, the field names which are created do not depend upon the system in which the customer is located. Also, after moving the client to another system, the field names must be reproducible. Accordingly, a client-specific namespace (e.g., /EXT/001) would not be sufficient.

Using only one Namespace for all clients is undesirable because not all runtime machines can currently handle extensions containing the same content but are alternatively used in different clients. Also, from an XML Schema perspective, it is inconsistent to add fields in the same namespace with different semantics. A creator-specific namespace may therefore be desired.

Objects which are generated during deployment to support extension fields (i.e., generated artifacts 860) are created system locally, and are not transported. Consequently, it is sufficient to locate these objects in a system-local package which is associated to a switch. Nevertheless, the generated objects reside in a separate generation namespace to avoid any collision with delivered artifacts. In this regard, the "TADIR-Name" of a generated object should be located in the generation namespace (as described above) whereas its content should be located in the creator-specific namespace.

The determination at S220 of the appropriate extensions to create may therefore be based on ABAP switch framework 870. Each development entity (transported or generated) is assigned to a package, which in turn is assigned to an ABAP switch. Business functions group several switches and can be grouped via business function sets. For simplicity, only switches are depicted in FIG. 8.

In a simplest example of field extensibility at a client site, a 1:1:1 relationship exists between package, switch, and business function since all the entities are generated by a field extensibility framework. Two instances of package/switch/business function may be employed, one for the transportable entities, and another one for the generated entities.

The system of FIG. 8 may support multi-client enablement/client separation for all relevant runtime machines and their extension metadata, including ABAP/DDIC (i.e., dynamic boxed components), persistency (i.e., client-dependent generic persistency), FSI and business object metadata, BSA, FSI, and rendering/parsing of messages. As a result, an extension created/activated in a specific client is not visible in the other clients, the creation/change/deletion/deactivation of an extension in a specific client does not affect any other clients, and the creation/change/deletion/deactivation of an extension does not enforce a recompilation/regeneration of loads or buffers for core objects.

The foregoing may be accomplished by separating the extension objects and their loads from the core part in corresponding metadata buffers/loads. Three methods for implementing this separation are considered and illustrated in FIG. 8:

Superset: All metadata for the core and all extensions are instantiated once in memory. The switch framework indicates which parts are active or not in a particular client. This variant exhibits no redundancy across clients, but content separation must be handled carefully (e.g., adding an extension in client 1 should not force client 2 to reload all data into the buffer)

Full Blown Replication: Metadata are completely duplicated into each client (i.e., when extensions exist). This variant is easy to implement but exhibits high redundancies in metadata buffers.

Delta Per Client: Core metadata are stored once, client-specific deltas are stored separately. This variant provides clear content separation, but still exhibits some redundancy when the same partner software is used in many clients.

After determining to create an associated extension, a field extensibility framework generates runtime artifacts from the metadata described with respect to FIG. 7. These runtime artifacts include metadata of a data type enhancement object. This metadata is associated with the extension field and stored in MDRS 316.

All generated objects are created system locally and are not transported. The activation of a client will prepare a package (located in Software Component "LOCAL"), an ABAP switch and a business function of type "client-specific" to which the package is assigned, a switch setting indicating that the corresponding business function is active in one client (or several clients in the partner use case), a Namespace in which the generated data type enhancements are located (e.g., /1XT/), and a creator-specific Namespace in which the Fieldname is located (e.g., /PHORMS/).

The field extensibility framework therefore creates a data type enhancement object in MDRS 316 via a corresponding MDRS API and sets DynamicExtensionIndicator=true. Data type enhancement objects are accompanied by a corresponding business object enhancement object to make the field available in the business object metadata. Thus, the switch setting for a business object enhancement and a data type enhancement object should be synchronized (e.g., by putting them into the same package).

An ABAP DDIC proxy object is created at S240 based on the metadata of the data type enhancement object. As mentioned above, the proxy structure for the data type enhancement object is flagged as "DYNAMIC='X'". Accordingly, the DDIC structure is created with the respective enhancement category and the EXT Field. Even though the data type enhancement is added on the top level of the Data Type metadata model (i.e., on "ESR" side) the ABAP fields are located in the sub-structure below the EXT Field.

ABAP proxy generation treats "EXT—simply as a prefix within the normal field name. As a result, the fieldname "EXT-/PHORMS/TRADE_FAIR" can be found in the proxy metadata. The available length for deriving the ABAP name of the field will therefore reduce to: 30–(<length of the EXT-Field>+1 (for the "–")+Length of the ABAP Namespace (e.g."/PHORMS/", at maximum 10)), so a field name for the EXT field should be as short as practical.

Technical issues may arise in adopting existing ABAP applications to ABAP DDIC proxy objects extended as described herein. For example, the ABAP Type descriptor typically loops across the components of this type. The following exhibits such a pattern:

```
lr_structdescr ?= cl_abap_typedescr=>describe_by_data(
<struct> ).
LOOP AT lr_structdescr->components ASSIGNING <comp>.
    IF   <comp>-type_kind =
cl_abap_typedescr=>typekind_struct1
        OR <comp>-type_kind =
```

-continued

```
cl_abap_typedescr=>typekind_struct2.
    ASSIGN COMPONENT <comp>-name
        OF STRUCTURE <struc> TO <sub_struct>.
    recursion( <sub_struct> ).
ELSE.
    ASSIGN COMPONENT <comp>-name OF STRUCTURE <struct>
TO <field>.
    handle_field( <field> ).
ENDIF.
ENDLOOP.
```

The ABAP Type Descriptor provides a special "type_ kinds" for dynamic boxed components (and also for "normal" boxed components). Existing CASE statements dealing with the different type_kinds (usually only with type_kind_struct1 and type_kind_struct2) will ignore (dynamic) boxed components or may even run into an exception.

The foregoing may be addressed using the following:

```
lr_structdescr ?= cl_abap_typedescr=>describe_by_data(
<struct> ).
LOOP AT lr_structdescr->get_component_unboxed( ).
    ASSIGNING <comp>.
    IF     <comp>-type_kind =
cl_abap_typedescr=>typekind_struct1
        OR <comp>-type_kind =
cl_abap_typedescr=>typekind_struct2.
        ASSIGN COMPONENT <comp>-name
            OF STRUCTURE <struc> TO <sub_struct>.
        recursion( <sub_struct> ).
    ELSE.
        ASSIGN COMPONENT <comp>-name OF STRUCTURE <struct>
TO <field>.
        handle_field( <field> ).
    ENDIF.
ENDLOOP.
```

The foregoing method will unpack all components belonging to (generic) boxed components and omit empty generic boxes. These changes may be implemented where cl_abap_typedescr=>components or cl_abap_typedescr=>get components is used.

ASSIGN COMPONENT on the EXT field produces the exception cx_sy_assign_empty_structure in cases where no fields are added in a specific client. Some embodiments therefore cache this exception. An empty EXT field will no longer be exposed once all usages of the ABAP Type Descriptor work with lr_structdescr->get_component_names (unpack_box=abap_true). Moreover, the ESR also will never return an empty EXT field, but will instead only return extension fields which have been added to the EXT field (e.g., EXT-MY_FIELD).

Figure 9:
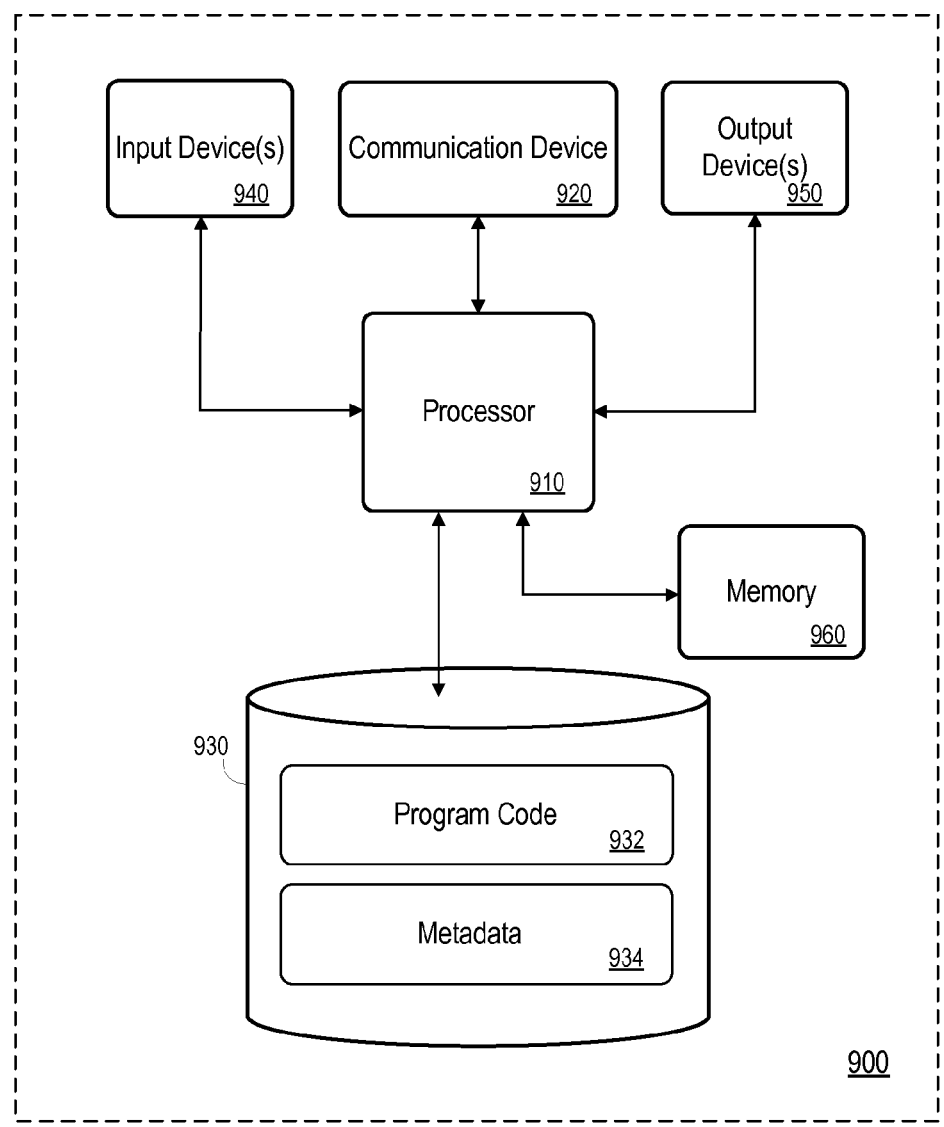
FIG. 9 is a block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of backend 300, but embodiments are not limited thereto. Apparatus 900 may include other unshown elements according to some embodiments.

Apparatus 900 includes processor 910 operatively coupled to communication device 920, data storage device 930, one or more input devices 940, one or more output devices 950 and memory 960. Communication device 920 may facilitate communication with external devices, such as an external design tool. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Program code 932 may be executed by processor 910 to cause apparatus 900 to perform any one or more of the processes described herein. Embodiments are not limited to execution of these processes by a single apparatus. Metadata 934 may include metadata described herein with respect to metadata 114 and/or MDRS 316. Data storage device 930 may also store data and other program code for providing additional functionality and/or which are necessary for operation thereof, such as device drivers, operating system files, etc.

Several of the foregoing diagrams represent logical architectures for describing processes according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method implemented by a computer in response to execution of program code by a processor of said computer, comprising:
    receiving a definition of an extension field to be added to a first node of a business object;
    determining to generate metadata for a data type enhancement object associated with the extension field, the determination being based on a switch framework that indicates which extensions are active or not active in a first client;
    generating metadata for the data type enhancement object associated with the extension field; and
    generating an ABAP dictionary proxy object based on the data type enhancement object,
    wherein the ABAP dictionary proxy object describes the extension field in a sub-structure of a first field of the ABAP dictionary proxy object;
    wherein a field of the first node of the business object and to which the extension field is to be added is defined by a first data type and a first attribute indicates whether the first data type is dynamically extensible;
wherein a field of a second node of the business object is defined by a second data type and a second attribute indicates whether the second data type is dynamically extensible; and
wherein the first attribute indicates that the first data type is dynamically extensible;
the method further comprising:
specifying that the first attribute is editable;
specifying that the second attribute is not editable;
synchronizing a switch setting for the data type enhancement object and a switch setting for a corresponding business object enhancement object;
providing a switch setting indicating that a business function is active in the first client; and
allowing addition of an extension in the first client without requiring that a second client reload all data into a data buffer.

2. A method according to claim 1, wherein the switch framework indicates that the extension field is active in the first client; and
wherein the determining to generate metadata for a data type enhancement object associated with the extension field comprises:
determining to generate the metadata for the data type enhancement object associated with the extension field based on the switch framework indication that the extension field is active in the first client.

3. A method according to claim 2, wherein generating the ABAP dictionary proxy object based on the data type enhancement object comprises:
determining that the data type enhancement object is dynamically-extensible.

4. A method according to claim 1, wherein generating the ABAP dictionary proxy object based on the data type enhancement object comprises:
determining that the data type enhancement object is dynamically-extensible.

5. A method according to claim 1, further comprising:
defining an ABAP dictionary structure including the first field.

6. A method according to claim 5, wherein the first field in the ABAP dictionary structure is typed with a customer-include structure.

7. A non-transitory computer-readable medium having stored thereon program code, the program code executable by a computer to:
receive a definition of an extension field to be added to a first node of a business object;
determine to generate metadata for a data type enhancement object associated with the extension field, the determination being based on a switch framework that indicates which extensions are active or not active in a first client;
generate metadata for the data type enhancement object associated with the extension field; and
generate an ABAP dictionary proxy object based on the data type enhancement object,
wherein the ABAP dictionary proxy object describes the extension field in a sub-structure of a first field of the ABAP dictionary proxy object;
wherein a field of the first node of the business object and to which the extension field is to be added is defined by a first data type and a first attribute indicates whether the first data type is dynamically extensible;
wherein a field of a second node of the business object is defined by a second data type and a second attribute indicates whether the second data type is dynamically extensible; and
wherein the first attribute indicates that the first data type is dynamically extensible;
the program code further executable by a computer to:
specify that the first attribute is editable;
specify that the second attribute is not editable
synchronize a switch setting for the data type enhancement object and a switch setting for a corresponding business object enhancement object;
provide a switch setting indicating that a business function is active in the first client; and
allow addition of an extension in the first client without requiring that a second client reload all data into a data buffer.

8. A medium according to claim 7, wherein the switch framework indicates that the extension field is active in the first client; and
wherein the determine to generate metadata for a data type enhancement object associated with the extension field comprises:
determine to generate the metadata for the data type enhancement object associated with the extension field based on the switch framework indication that the extension field is active in the first client.

9. A medium according to claim 8, wherein the program code executable to generate the ABAP dictionary proxy object based on the data type enhancement object comprises program code executable to:
determine that the data type enhancement object is dynamically-extensible.

10. A medium according to claim 7, wherein the program code executable to generate the ABAP dictionary proxy object based on the data type enhancement object comprises program code executable to:
determine that the data type enhancement object is dynamically-extensible.

11. A medium according to claim 7, the program code further executable by a computer to:
define an ABAP dictionary structure including the first field.

12. A medium according to claim 5, wherein the first field in the ABAP dictionary structure is typed with a customer-include structure.

13. A system comprising:
a computer to:
receive a definition of an extension field to be added to a first node of a business object;
determine to generate metadata for a data type enhancement object associated with the extension field, the determination being based on a switch framework that indicates which extensions are active or not active in a first client;
generate metadata for the data type enhancement object associated with the extension field; and
generate an ABAP dictionary proxy object based on the data type enhancement object,
wherein the ABAP dictionary proxy object describes the extension field in a sub-structure of a first field of the ABAP dictionary proxy object;
wherein a field of the first node of the business object and to which the extension field is to be added is defined by a first data type and a first attribute indicates whether the first data type is dynamically extensible;

wherein a field of a second node of the business object is defined by a second data type and a second attribute indicates whether the second data type is dynamically extensible; and wherein the first attribute indicates that the first data type is dynamically extensible;

the computer further to:

specify that the first attribute is editable;

specify that the second attribute is not editable;

synchronize a switch setting for the data type enhancement object and a switch setting for a corresponding business object enhancement object;

provide a switch setting indicating that a business function is active in the first client; and allow addition of an extension in the first client without requiring that a second client reload all data into a data buffer.

14. A system according to claim 13, wherein the switch framework indicates that the extension field is active in the first client;

and wherein the determine to generate metadata for a data type enhancement object associated with the extension field comprises:

determine to generate the metadata for the data type enhancement object associated with the extension field based on the switch framework indication that the extension field is active in the first client.

15. A system according to claim 14, wherein generation of the ABAP dictionary proxy object based on the data type enhancement object comprises:

determination that the data type enhancement object is dynamically-extensible.

16. A system according to claim 13, wherein generation of the ABAP dictionary proxy object based on the data type enhancement object comprises:

determination that the data type enhancement object is dynamically-extensible.

17. A system according to claim 13, the computer further to:

define an ABAP dictionary structure including the first field.

18. A system according to claim 17, wherein the first field in the ABAP dictionary structure is typed with a customer-include structure.

* * * * *